United States Patent [19]

Ericksen

[11] Patent Number: 4,654,988

[45] Date of Patent: Apr. 7, 1987

[54] METHOD FOR DISPLAYING THE AVAILABILTY OF VIDEOCASSETTE FILMS FOR RENTAL

[76] Inventor: Gregroy S. Ericksen, P.O. Box A, Bountiful, Utah 84010

[21] Appl. No.: 724,012

[22] Filed: Apr. 17, 1985

[51] Int. Cl.⁴ .............................................. G09F 1/00
[52] U.S. Cl. .................................. 40/124.1; 40/19.5; 40/124
[58] Field of Search ...................... 40/124, 19.5, 124.1, 40/622; 283/75, 76, 77; 206/44.11; 312/234, 234.1, 234.4, 234.5; 211/59.1; 248/220.3; 186/35

[56] References Cited

U.S. PATENT DOCUMENTS

| | | | |
|---|---|---|---|
| 2,626,061 | 1/1953 | Girouard | 211/59.1 |
| 2,857,696 | 10/1958 | Barrow | 206/44.11 |
| 3,270,891 | 9/1966 | Briggs | 312/234 |
| 3,607,524 | 9/1971 | Kuhns | 283/75 |
| 3,945,467 | 3/1976 | Levitz | 312/234.1 |
| 4,179,831 | 12/1979 | Cook | 40/19.5 |
| 4,236,336 | 12/1980 | Strom | 40/622 |
| 4,245,414 | 1/1981 | Shypula | 40/124 |
| 4,378,884 | 4/1983 | Anderson | 211/59.1 |

Primary Examiner—Gene Mancene
Assistant Examiner—Cary E. Stone
Attorney, Agent, or Firm—Shlesinger, Arkwright, Garvey & Fado

[57] ABSTRACT

A method for displaying the availability of videocassette films for rental including the following steps: producing indicating cards having indicia printed thereon identifying the films available for rental; positioning indicating cards for various videocassette films at different locations on a display board; positioning a plurality of indicating cards for identical videocassette films at the same location; selectively removing the reproductions individually from the display board as the videocassette corresponding thereto is rented; and selectively repositioning the reproductions as the videocassette corresponding thereto is returned.

12 Claims, 2 Drawing Figures

METHOD FOR DISPLAYING THE AVAILABILTY OF VIDEOCASSETTE FILMS FOR RENTAL

BACKGROUND OF INVENTION

A. This invention pertains to a card design and process used to identify the rental and availability of video cassette motion pictures and video cassette recorders.

B. Prior to the invention the method used consisted of acutual tape boxes which come in various sizes and shapes and are used to indicate availability for sale or rental of video cassettes.

The actual physical box or sleeve is utilized by placing it on a grooved shelf and either removing the box leaving an empty shelf or by placing a sticker on the box showing whether the cassette is or is not available.

C. The present invention overcomes the problems and disadvantages of prior art by providing smaller area needed for display as well as a process whereby a customer can quickly determine whether a particular video movie cassette is available or sold or rented out.

BRIEF SUMMARY OF THE INVENTION

The invention allows video cassette movie selection and availability to be displayed in a substantially smaller display area of uniform dimension and size.

It allows the customer to identify availability both as to what is currently available (color card) and what is prospectively available (black and white card) and only temporarily unavailable.

DETAILED SUMMARY OF INVENTION

In accordance with the invention the plastic video cassette card process consists of:

1. Purchasing video movie cassette and removing the outside sleeve or box.

2. A photographic image is taken of the sleeve both front and back and two separate identical sets of photographs are made to wit: a front and back of the sleeve in color and a front and back of the sleeve in black and white.

These photographs of the front and back of the sleeve are reduced to a uniform size of 4"×6" such that all photographic representations of the sleeve are uniform in size and shape.

3. The colored photographs of the front and back of the sleeve are glued back to back and placed in a plastic laminated envelope. A typeset designation is placed on the face of the back and white photograph which states "All Rented Out" or "All Sold Out" and the black and white photograph is also placed in a plastic sleeve.

4. Holes are punched in the top of both envelopes and the black and white plastic photograph is placed on a metal peg hook first followed by the colored laminated photograph.

5. Customers remove the color front laminated card to buy or rent the video cassette move from a vendor.

6. The black and white card is left on the rack to designate availability of the video cassette and demonstrates that it is temporarily sold or rented out.

The object of the invention is to do away with the display of bulky video container boxes; to reduce the amount of space required for the process and to display what movies are in or out of stock.

BRIEF DESCRIPTION OF THE DRAWING

The accompanying drawing illustrates the invention. In such drawing.

DETAILED DESCRIPTION OF THE PREFERRED EMBODIMENT

Figure 1:
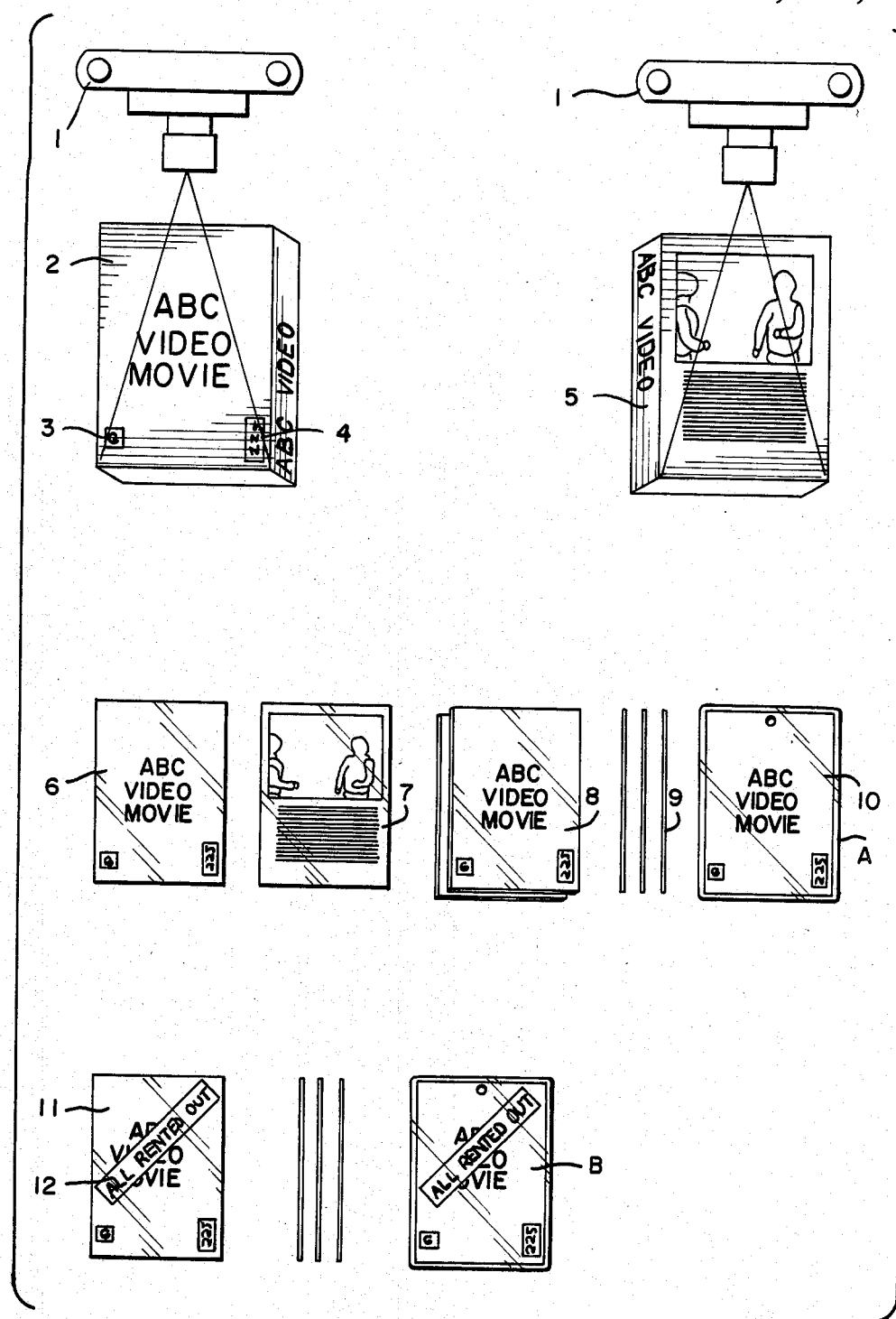
FIG. 1: Demonstrates the design of the plastic video cassette cards.

The front and back of a video box or sleeve is demonstrated in 2 and 5 in FIG. 1. 3 demonstrates the movie rating and 4 designates a numerical classification.

A colored photograph of the box is taken and reduced to two 4×6 photographs as demonstrated in 6 and 7 of FIG. 1.

The photos are then glued back to back as demonstrated in 8 of FIG. 1. The photos are then glued between a plastic film as shown in 9 of FIG. 1 and a hole is punched.

10 of FIG. 1 shows the front of the finished color card A.

A black and white photo is shown in 11 and all rented out strip is placed on the photo as shown in 12 of FIG. 1. The same process is followed as with the color photograph resulting in the formation of a finished black and white card B.

Figure 2:
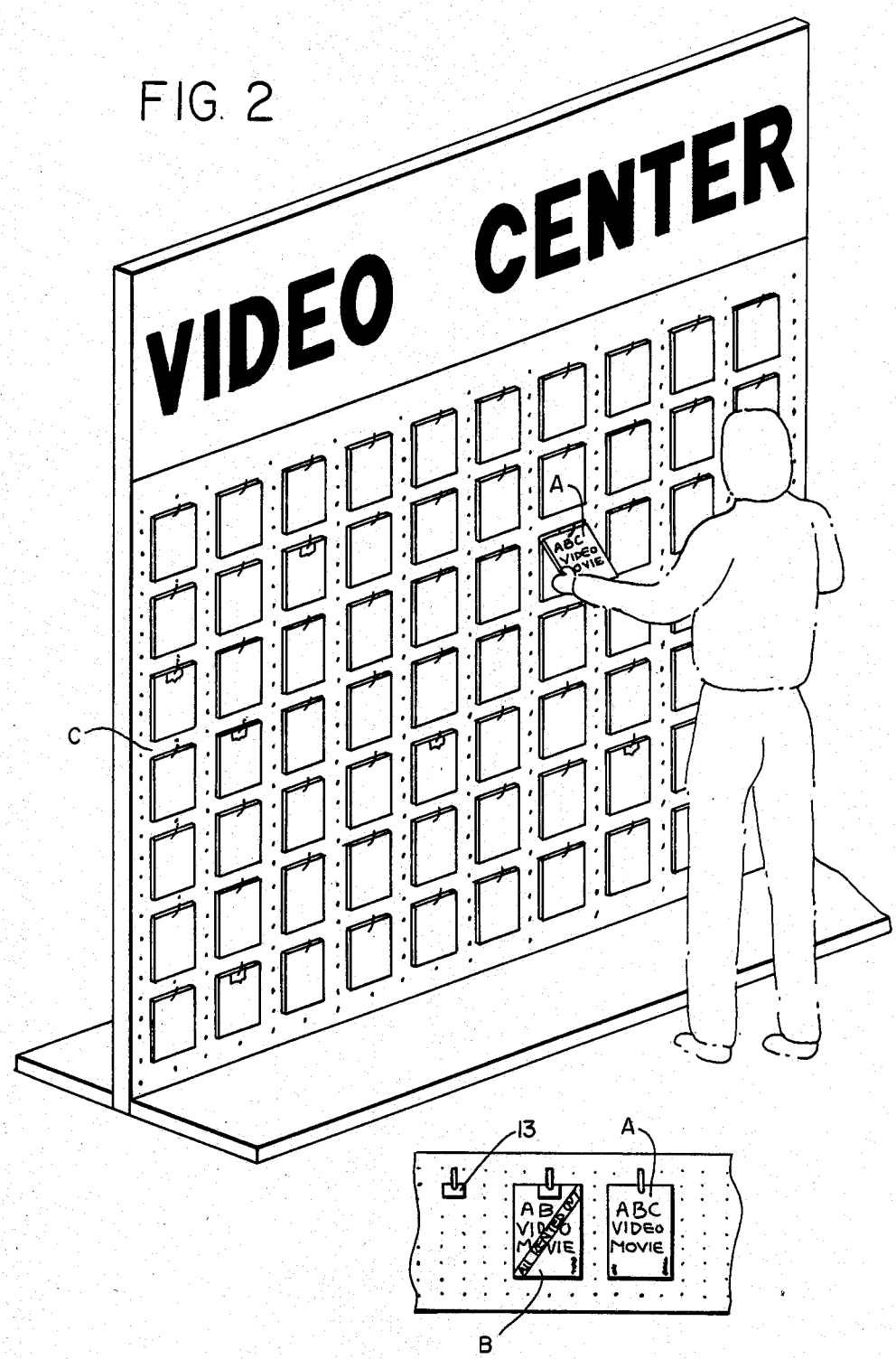
FIG. 2: Demonstrates the process of video cassette availability and rental.

FIG. 2 demonstrates the process of determining availability of video movie cassettes.

The black and white plastic video card B of FIG. 2 is hung on a metal peg hook 13 mounted on display board C and designates that the video movie cassette is unavailable. The color plastic video card A of FIG. 2 is then hung over the black and white plastic video card B to show that the video cassette movie is available. The customer pulls the color plastic video card A of FIG. 2 from the display board C when he desires to rent the particular film illustrated on the video card.

I claim:

1. A process for displaying the availability of videocassette films for rental, comprising the steps of
   (a) reproducing the information on a plurality of videocassette containers which identify the contents thereof
   (b) hanging the reproductions on a display board to indicate the availability of the videocassette films for rental
   (c) the number of reproductions on the display board corresponding to the number of videocassette films available for rental
   (d) the reproductions for different videocassette films being located in different positions on the display board and the reproductions for the same videocassette films being positioned in superposed relation on the display board, and
   (e) selectively removing the reproductions individually from the display board as the videocassette corresponding thereto is rented.

2. The process of claim 1, wherein
   (a) the reproductions are detachably hung on hooks affixed to the display board.

3. The process of claim 1, wherein
   (a) photographic images of the front and rear of videocassette containers are taken
   (b) the photographic image of the front and back being encased in a transparent envelope so that the information thereon is visible.

4. The process of claim 3, wherein
(a) the photographic images are reduced in size to permit cardlike members of uniform size to be displayed in a relatively small area.

5. The process of claim 1, wherein
(a) one extra reproduction of each videocassette container is made, and
(b) indicia indicating the unavailability of the corresponding videocassette film is imprinted on the reproduction
(c) said extra reproduction of each videocassette film being attached to the display board first and covered by the other reproductions for the same videocassette film.

6. A process for displaying the availability of videocassette films for rental, comprising the steps of
(a) reproducing the fronts and backs of videocassette film containers having information thereon relative to the film
(b) placing the reproduced fronts and backs in a transparent envelope so that the information thereon is visible
(c) hanging the envelopes on a display board to indicate the availability of the corresponding videocassette films for rental
(d) the envelopes containing reproductions for different films being located in different positions on the display board and the envelopes containing reproductions for the same videocassette films being positioned in superposed relation on the display board
(e) the number of reproductions on the display board corresponding to one more than the number of videocassette films available for rental
(f) the one additional reproduction being marked to indicate the unavailability of the corresponding videocassette film and being attached to the display board first and covered by other reproductons for the same videocassette film.

7. The process of claim 6, wherein
(a) the envelopes are hung on hooks affixed to the display board.

8. The process of claim 6, wherein
(a) the reproductions of the fronts and backs of the videocassette film containers are reduced in size to permit reproductions of uniform size to be displayed in a relatively small area.

9. A method for displaying the selection of various videocassette films, identifying the number of videocassettes available for a particular film to the vendor, and indicating to the consumer the particular films temporarily out of stock, comprising the steps of:
(a) hanging indicating means having indicia printed thereon identifying the contents of different videocassette films at different locations on the display board,
(b) hanging at least one additional indicating means for at least one of the different videocassette films in superimposed relation to corresponding indicating means,
(c) the number of indicating means of a particular videocassette film representing the number of videocassette films in stock available for rental,
(d) selectively removing the indicating means individually from the display board as the videocassette corresponding thereto is rented, and
(e) selectively repositioning the indicating means as the videocassette corresponding thereto is returned.

10. The method of claim 9, wherein:
(a) said indicating means are produced by taking photographic images of the front and rear of videocassette containers,
(b) said photographic images of the front and back are encased in a transparent envelope so that they are readily visible.

11. The process of claim 10, wherein:
(a) said photographic images are reduced in size to permit card-like members of uniform size to be displayed in a relatively small area.

12. The process of claim 9, wherein:
(a) one extra indicating means of the different videocassette films is made,
(b) indicia indicating the unavailability of the corresponding videocassette film is imprinted on said extra indicating means, and
(c) said extra indicating means of each videocassette film being attached to the display board first and covered by a plurality of indicating means for the same videocassette film.

* * * * *